United States Patent Office 2,861,598
Patented Nov. 25, 1958

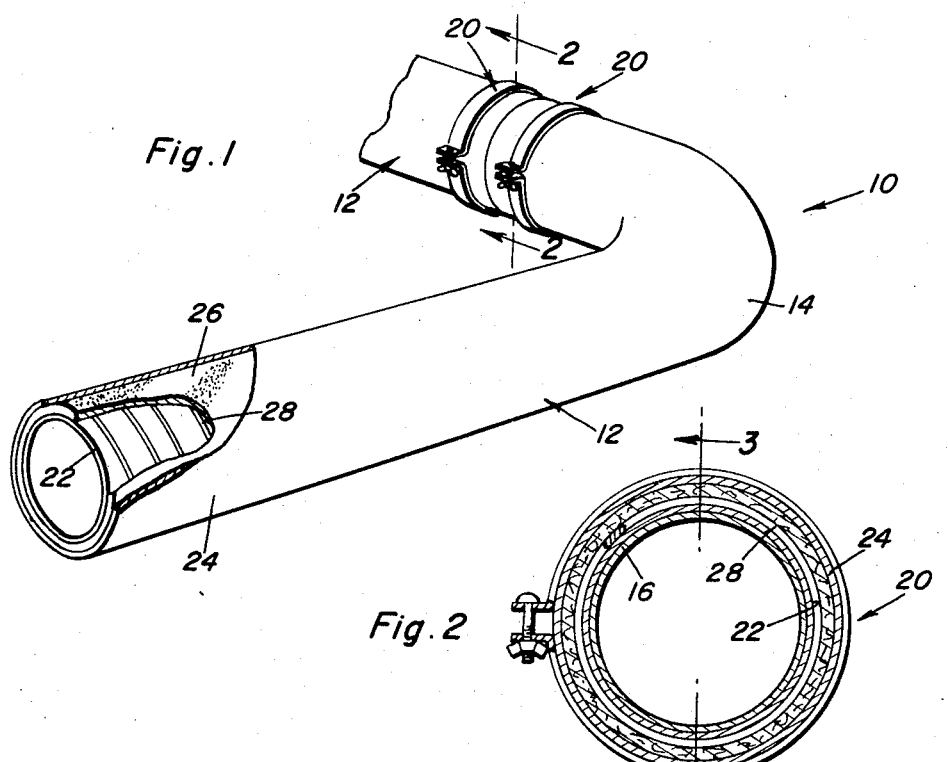
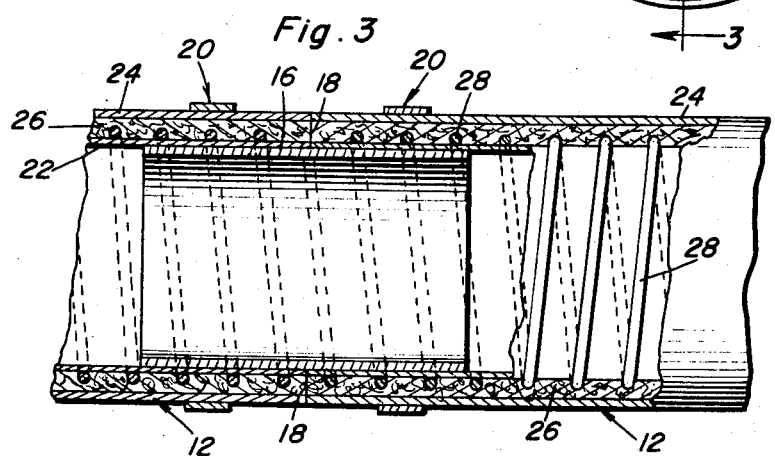
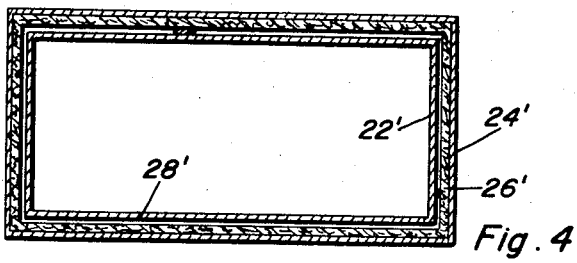

2,861,598

FLEXIBLE DUCT CONSTRUCTION

Stephen D. Carder, Jr., Oklahoma City, Okla., and Richard D. Savacool, Camden, Ark.

Application September 29, 1955, Serial No. 537,434

1 Claim. (Cl. 138—56)

This invention relates generally to insulating ducts or conduits and is more particularly concerned with a novel insulated duct construction which is readily usable for either heating or cooling systems and which may be readily installed and bent about impediment in a building without necessitating material remodeling thereof.

A primary object of invention in conformance with that set forth above is to provide a readily bendable or flexible metal duct which is relatively easily manipulated and including highly efficient heat reflective and heat and cold air nonconductors for transmitting hot or cold air with a minimum of heat loss or gain during transmission.

Another object of invention in conformance with that set forth above is to provide a readily manipulable and installable insulated duct of the character set forth including a pair of spaced inner and outer heat insulating and reflective wall portions having a hot and cold insulating material interposed therebetween and including means permitting ready bending of the duct about its longitudinal axis while maintaining a substantially uniform cross-section.

Another object of invention is to provide an insulating duct of the character set forth which is economically and readily manufactured, easily installed and handled, highly acceptable and utilitarian for the purpose intended.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view with portions broken away and in section showing the manner in which the novel insulated duct might be installed;

Figure 2 is a sectional view taken substantially on line 2—2 of Figure 1;

Figure 3 is a longitudinal fragmentary sectional view taken substantially on line 3—3 of Figure 2; and Figure 4 is a cross sectional view of another embodiment of the novel duct construction.

The installation of the novel duct is indicated generally at 10 and includes a plurality of duct sections 12 which may be readily bent as seen at 14 throughout their longitudinal axis, the sections being connected by means of a tubular insertion sleeve 16 which may be of any suitable material providing desired rigidity and sealing qualities between the abutting ends 18 of said conduit or duct sections, the adjacent ends of the duct sections being secured by means of suitable clamp assemblies 20, of any suitable character, the only requisite being that they are adequate for providing a proper seal between the two duct sections being connected together whereupon no loss of heated or cooled air being transmitted therein will be lost past the ends 18 of said sections.

Each of said duct sections 12 comprises an inner and outer wall portion 22 and 24, respectively which may be of any suitable heat reflective metal foil, aluminum foil having the desirable characteristics which will permit the duct to be bent readily about various rafters, columns, etc. in a building whereupon the insulated duct may be installed in buildings heretofore not intended to be utilized with an air-conditioning system or a hot air system which are being utilized in newly constructed or modernized building constructions.

The inner and outer walls 22 and 24 have interposed therebetween a suitable fibrous insulating material 26 which has the desirable insulating properties of preventing the transmission of cold or heat between the inner and outer walls, a fiberous spun glass material having the desirable qualities for this purpose.

Thus it is apparent that the inner and outer walls 22 as well as the fiberous insulating material 26 will permit the ready bending of the duct section in various curved positions about the longitudinal axis of said section.

Circumposed on the outer peripheral surface of the inner wall 22 of the duct section is a coil spring member 28 of any suitable material, said coil spring resisting lateral compressive forces and permitting the bending of the duct about the longitudinal axis, hence the coil spring 28 will substantially retain the uniform cross sectional configuration of the insulated duct retaining the desirable computed properties relative to capacity or ability to handle a given volume per unit of time of moving hot or cold air therein, without destroying or affecting the heretofore described insulating properties inherent therein.

Although there has been disclosed a substantially circular cross section insulated duct, as seen in Figure 4, the duct may have the configuration of a rectangle which includes the inner and outer flexible walls 22' and 24', respectively, having interposed therebetween the fiber glass insulating material 26' and a suitable coiled wire 28' it being understood that a duct of the configuration disclosed in Figure 4 will of necessity be bent about either a vertical or horizontal axis, however, such duct will be available to function in the manner heretofore described relative to the embodiment of Figures 1 through 3.

Furthermore, it is to be considered within the purview of invention that the duct may take any suitable cross sectional configuration desired, such as oval, square, etc.

The function and application of the novel insulative duct being readily apparent further explanation is believed to be unnecessary, and there has been accordingly disclosed a novel insulated duct construction which fully conforms with the objects of invention heretofore set forth.

Various positional directional terms such as "inner," "outer," etc., are utilized herein to have only a relative connotation to aid in describing the device and are not intended to require any particular orientation with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a flexible insulated duct or the like comprising bendable inner and outer spaced insulating heat reflective metal wall portions, the inner wall portion having a smooth periphery, a single layer of bendable fibrous insulating material interposed between said wall portions, and a compressive resistant wire coil extending about and engaging the periphery of said inner wall portion and partly embedded in said insulating material for maintaining a substantially uniform cross-sectional insulated duct and permitting said duct to be readily bent about its longitudinal axis, said insulation material spacing said outer wall portion from said wire coil to increase flexibility in said duct.

References Cited in the file of this patent

UNITED STATES PATENTS

| | | |
|---|---|---|
| 294,780 | Hicks | Mar. 11, 1884 |
| 376,401 | Wilder et al. | Jan. 10, 1888 |
| 752,700 | Nicholls | Feb. 23, 1904 |
| 992,516 | Mulconroy et al. | May 16, 1911 |
| 1,052,861 | Swanson et al. | Feb. 11, 1913 |
| 1,942,468 | Andrews | Jan. 9, 1934 |
| 2,321,064 | Broedling | June 8, 1943 |